United States Patent
Ishii

(10) Patent No.: US 11,486,702 B2
(45) Date of Patent: Nov. 1, 2022

(54) ROAD SURFACE CONDITION DETERMINATION METHOD AND ROAD SURFACE CONDITION DETERMINATION APPARATUS

(71) Applicant: BRIDGESTONE CORPORATION, Tokyo (JP)

(72) Inventor: Keita Ishii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 621 days.

(21) Appl. No.: 16/488,654

(22) PCT Filed: Apr. 26, 2018

(86) PCT No.: PCT/JP2018/017082
§ 371 (c)(1),
(2) Date: Aug. 26, 2019

(87) PCT Pub. No.: WO2018/207648
PCT Pub. Date: Nov. 15, 2018

(65) Prior Publication Data
US 2020/0240777 A1    Jul. 30, 2020

(30) Foreign Application Priority Data
May 12, 2017  (JP) .............................. JP2017-095896

(51) Int. Cl.
*G01B 17/08*   (2006.01)
*B60C 19/00*   (2006.01)

(52) U.S. Cl.
CPC .............. *G01B 17/08* (2013.01); *B60C 19/00* (2013.01); *B60C 2019/004* (2013.01)

(58) Field of Classification Search
CPC ...................................................... G01B 17/08
See application file for complete search history.

(56) References Cited

U.S. PATENT DOCUMENTS 9,434,387 B2 *  9/2016  Hanatsuka .............. B60C 99/00
9,452,653 B2 *  9/2016  Kikuchi .............. B60W 30/025
(Continued)

FOREIGN PATENT DOCUMENTS

CN         1819572 A     8/2006
CN      101275900 A    10/2008
(Continued)

OTHER PUBLICATIONS

International Preliminary Report on Patentability and Translation of the Written Opinion dated Nov. 21, 2019 from the International Bureau in application No. PCT/JP2018/017082.
(Continued)

*Primary Examiner* — Michael A Berns
(74) *Attorney, Agent, or Firm* — Sughrue Mion, PLLC

(57) ABSTRACT

A method of determining a road surface condition includes: acquiring, when determining a condition of a road surface being in contact with a tire from a time-varying waveform of vibration of the running tire, the time-varying waveform of vibration having been detected by a vibration detecting means, a plurality of intrinsic vibration modes, from data of the time-varying waveform of vibration of the tire, using an algorithm of empirical mode decomposition; selecting an arbitrary intrinsic vibration mode from the plurality of intrinsic vibration modes; calculating a statistic amount from the distribution of feature data calculated by performing Hilbert transform on the selected intrinsic vibration mode to set the statistic amount as a feature amount; and determining (Continued)

the road surface condition from the feature amount and a feature amount obtained in advance for each road surface condition.

6 Claims, 8 Drawing Sheets

(56) References Cited

U.S. PATENT DOCUMENTS

| | | | | |
|---|---|---|---|---|
| 10,377,385 | B2* | 8/2019 | Hanatsuka | B60W 40/06 |
| 11,276,305 | B2* | 3/2022 | Kakehi | G01S 19/42 |
| 2007/0050121 | A1 | 3/2007 | Ammon et al. | |
| 2012/0330493 | A1 | 12/2012 | Hanatsuka et al. | |
| 2015/0210286 | A1 | 7/2015 | Hanatsuka et al. | |
| 2019/0212138 | A1* | 7/2019 | Hanatsuka | B60C 23/0488 |
| 2020/0240777 | A1* | 7/2020 | Ishii | G01B 17/08 |

FOREIGN PATENT DOCUMENTS

| | | |
|---|---|---|
| CN | 102519577 A | 6/2012 |
| JP | 3892723 B2 | 3/2007 |
| JP | 2009-056818 A | 3/2009 |
| JP | 4263400 B2 | 5/2009 |
| JP | 2010125984 A | 6/2010 |
| JP | 2014-035279 A | 2/2014 |
| JP | 2016-107833 A | 6/2016 |
| WO | 2016088548 A1 | 6/2016 |

OTHER PUBLICATIONS

Li Xiusong et al., "Research on the algorithm of the Road Friction Coefficient Estimation based on the EMD algorithm", Master Thesis, Jilin University China, 2008, pp. 9, 12, 19, 20, 44 & 45 (14 pgs total).

Communication dated Mar. 8, 2021, from the China National Intellectual Property Administration in application No. 2018800314556.

International Search Report for PCT/JP2018/017082, dated Jul. 3, 2018.

Communication dated Apr. 3, 2020 from the European Patent Office in application No. 18798494.3.

Goto, T., et al., "Road Condition Classification Using a New Global Alignment Kernel", 2015 IEEE 25th International Workshop On Machine Learning For Signal Processing, Sep. 17-20, 2015, Boston, 6 pages, XP032808398.

* cited by examiner

ROAD SURFACE CONDITION DETERMINATION METHOD AND ROAD SURFACE CONDITION DETERMINATION APPARATUS

CROSS REFERENCE TO RELATED APPLICATIONS

This Application is a National Stage of International Application No. PCT/JP2018/017082 filed Apr. 26, 2018, claiming priority based on Japanese Patent Application No. 2017-095896 filed May 12, 2017.

TECHNICAL FIELD

The present invention relates to a method and an apparatus for determining a state of a road surface on which a vehicle travels.

BACKGROUND

Conventionally, as a method of determining a road surface condition by using only data of a time-series waveform of tire vibration during running, there has been proposed a method of determining a road surface condition by using a function as a GA kernel calculated from a vibration level of a particular frequency band, which is a feature vector of each time window calculated from a time-series waveform extracted by multiplying a time-series waveform of the tire vibration by a window function, and from a road surface feature vector of each time window calculated from a time-series waveform of tire vibration previously obtained for each road surface condition (see Patent Document 1, for example).

CITATION DOCUMENT

Patent Document

Patent Document 1: Japanese Unexamined Patent Application Publication No. 2014-35279

SUMMARY OF THE INVENTION

Technical Problem

However, in the conventional method, because a time-series waveform is time-stretched/contracted, there has been an issue that not only much time is required for calculation of the GA kernel but also processing is very heavy since the number of data is large.

Time-stretching/contracting is required for comparing obtained vibration waveform (acceleration waveform) of a tire, for example, in a case where data of tire one round (perimeter of 2 m) is obtained at a sampling rate of 10 kHz, when running at a speed of 30 km/h, measuring points become 2400 points whereas when running at a speed of 90 km/h, measuring points become 800 points. For this reason, it has been difficult to simply compare waveforms hence it has been required to expand/contract the waveforms with respect to a time axis.

This time-expansion/contraction has been a major factor contributing to hinder decrease in the amount of computations.

The present invention has been made in view of the conventional problem and aims at providing a method and an apparatus capable of remarkably reducing the amount of computations and determining a road surface condition quickly and accurately.

Solution to Problem

The present invention relates to a method of determining a condition of a road surface being in contact with a tire from a time-varying waveform of vibration of the running tire, the time-varying waveform of vibration having been detected by a vibration detecting means. The method includes: a step of detecting the time-varying waveform of vibration of the tire; a step of acquiring a plurality of natural vibration modes, from data of the time-varying waveform, using an algorithm of empirical mode decomposition; a step of selecting and extracting an arbitrary natural vibration mode from the plurality of natural vibration modes; a step of calculating feature data by performing Hilbert transform on the extracted intrinsic vibration mode; a step of calculating a feature amount from a distribution of the feature data; and a step of determining the road surface condition from the calculated feature amount and a feature amount obtained in advance for each road surface condition, in which the feature amount is a statistic amount such as an average, a standard deviation, a skewness and a kurtosis of distribution of the feature data.

Further, The present invention also relates to a road surface condition determination apparatus for determining a condition of a road surface being in contact with a tire. The apparatus includes: a vibration detecting means that is attached to the tire and that detects a time-varying waveform of vibration of the running tire; an intrinsic vibration mode extracting means that acquires a plurality of intrinsic vibration modes, from the time-varying waveform, using an algorithm of empirical mode decomposition, and extracting an arbitrary intrinsic vibration mode from the acquired plurality of intrinsic vibration modes; a feature data calculating means that calculates feature data by performing Hilbert transform on the extracted intrinsic vibration mode; a feature amount calculating means that calculates a feature amount from a distribution of the feature data; a storage means that stores the feature amount calculated using the time-varying waveform of the vibration having been obtained in advance for each road surface condition; a kernel function calculating means that calculates a Gaussian kernel function from the calculated feature amount and the feature amount having been obtained in advance for each road surface condition; and a road surface condition determining means that determines the road surface condition from a value of discriminant function using the calculated Gaussian kernel function, in which the feature amount is a statistic amount such as an average, a standard deviation, a skewness and a kurtosis of distribution of the feature data, and in which the road surface condition determining means compares values of discriminant functions obtained for respective road surface conditions so as to determine the road surface condition.

The summary of the invention does not enumerate all the necessary features of the present invention, but sub-combinations of these feature groups may also become the invention.

DESCRIPTION OF EMBODIMENT

Figure 1:
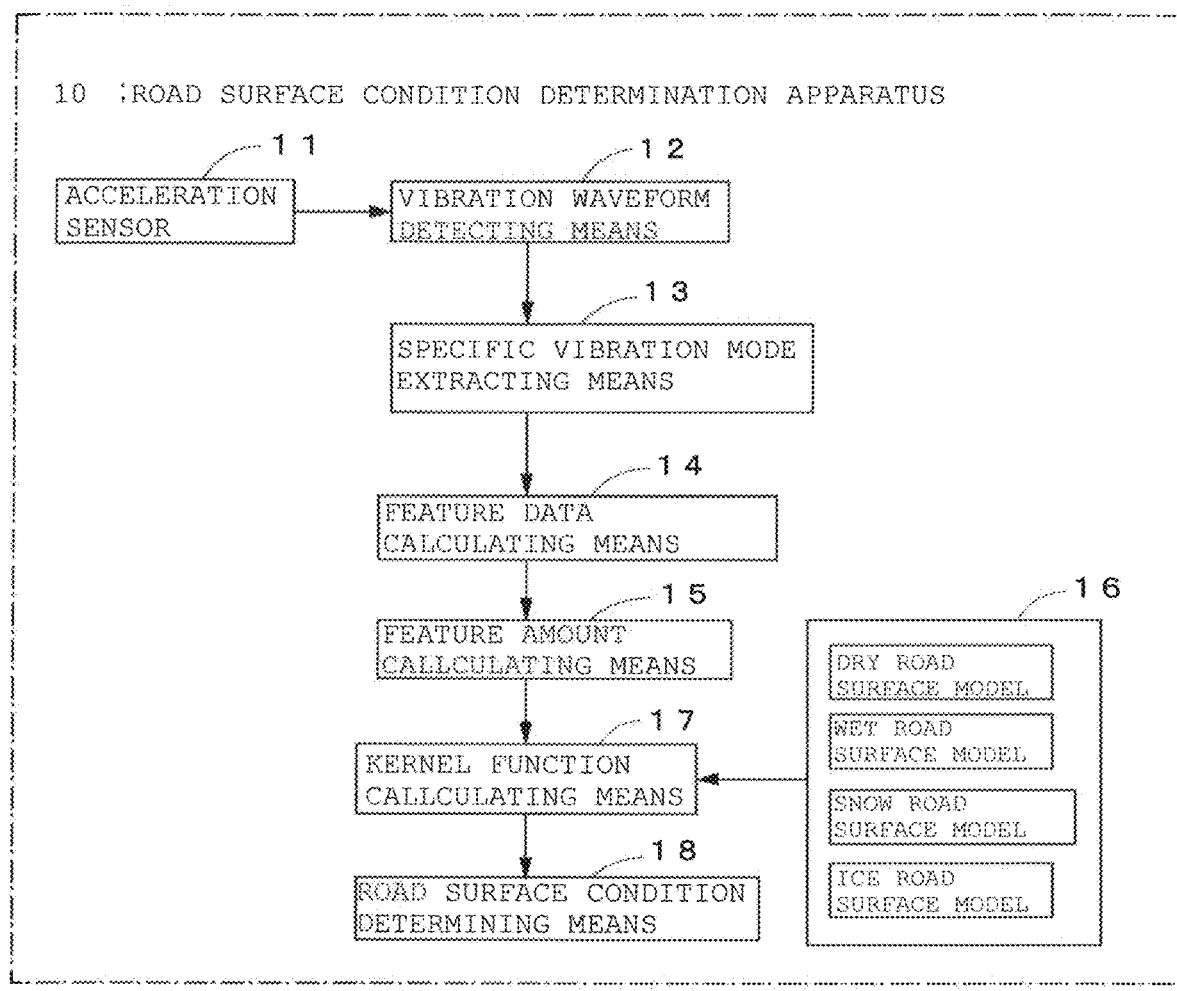
FIG. 1 is a functional block diagram illustrating a configuration of a road surface condition determination apparatus according to an exemplary embodiment of the present invention.

FIG. 1 is a functional block diagram illustrating a configuration of a road surface condition determination apparatus 10.

The road surface condition determination apparatus 10 includes an acceleration sensor 11 as a tire vibration detecting means, a vibration waveform detecting means 12, an intrinsic vibration mode extracting means 13, a feature data calculating means 14, a feature amount calculating means 15, a memory means 16, a kernel function calculating means 17 and a road surface condition determining means 18.

The vibration waveform detecting means 12 to the road surface condition determining means 18 are each configured, for example, by computer software and a memory such as a RAM.

Figure 2:
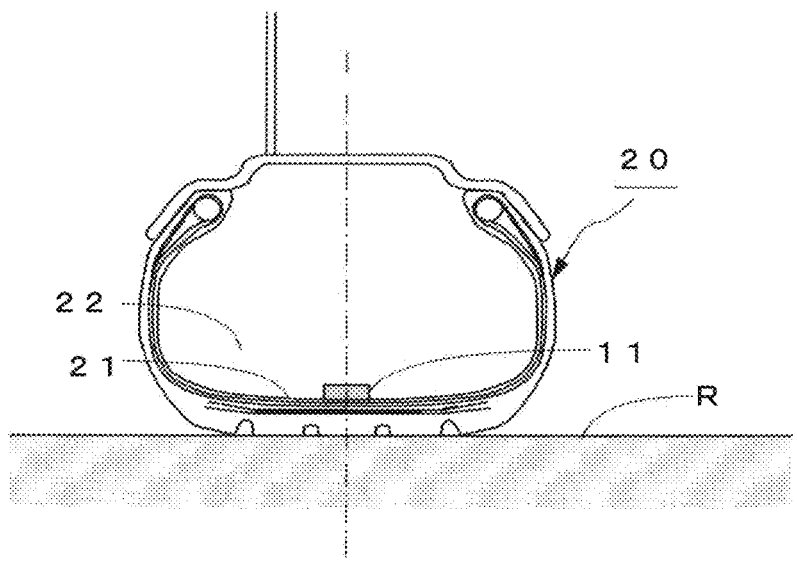
FIG. 2 is a diagram illustrating an example of a mounting position of an acceleration sensor.

The acceleration sensor 11 is, as shown in FIG. 2, disposed integrally with an inner liner portion 21 of the tire 20 in a substantially central portion on a tire chamber 22 side, for detecting a vibration of the tire 20 due to the input from the road surface. A signal of the tire vibration, which is an output of the acceleration sensor 11 is, for example, converted into a digital signal after amplified by an amplifier and sent to the vibration waveform detecting means 12.

The vibration waveform detecting means 12 extracts, for each one rotation of the tire, the acceleration waveform, which is a time-series waveform of tire vibration, from the signal of the tire vibration detected by the acceleration sensor 11.

Figure 3:
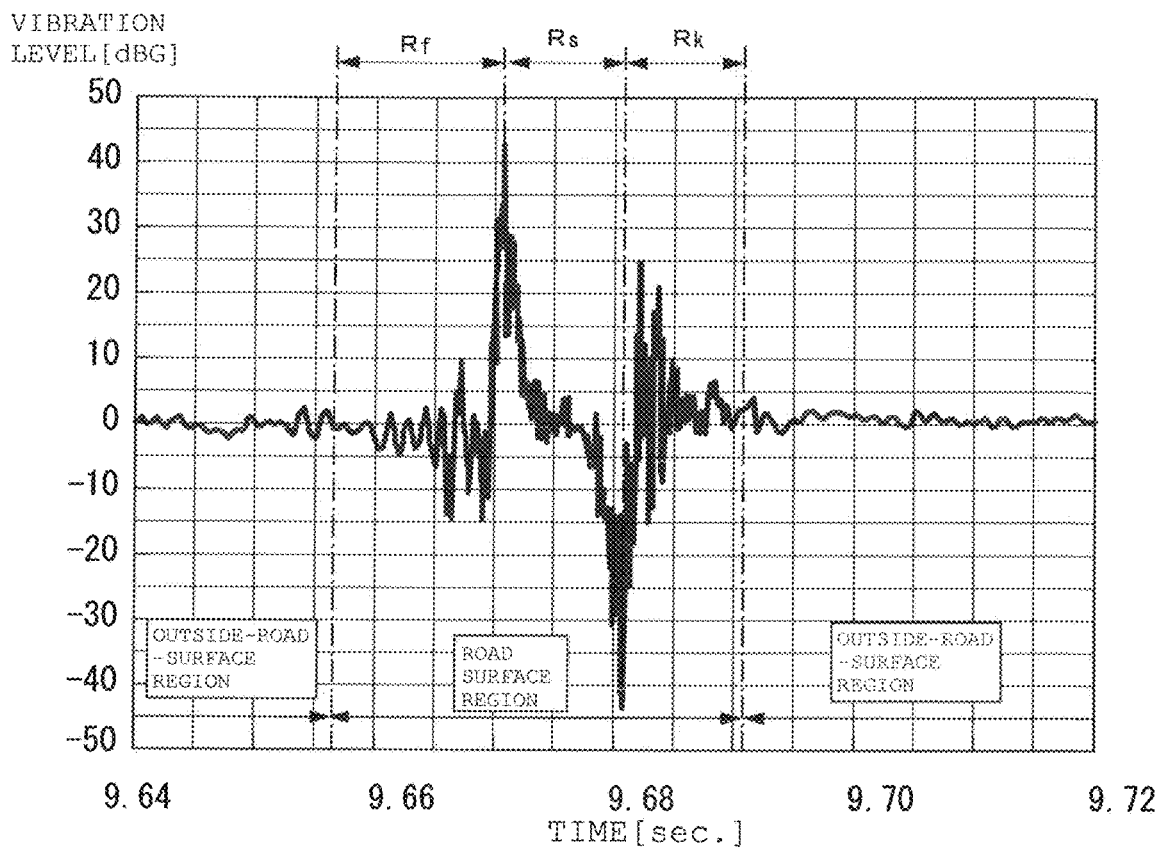
FIG. 3 is a diagram illustrating an example of a time-series waveform of vibration of a tire.

FIG. 3 is a diagram illustrating an example of the time-series waveform of the tire vibration. The time-series waveform of the tire vibration has large peaks in the vicinity of a step-in position and the vicinity of a kick-out position, and different vibrations appear in a pre-step-in region $R_f$ before a land portion of the tire 20 is grounded and also in a post-kick-out region $R_k$ after the land portion of the tire 20 is left from the road surface. On the other hand, because a region before the pre-step-in region $R_f$ and a region after the post-kick-out region $R_k$ (hereinafter referred to outside-road-surface regions) are not substantially affected by the influence of the road surface, a vibration level is small and information on the road surface is not included.

Incidentally, as the definition of the outside-road-surface region, for example, the outside-road-surface region may be defined in such a manner that a background level is set for the acceleration waveform, and a region having a vibration level smaller than the background level is determined to be the outside-road-surface region.

In this example, among the acceleration waveforms, an acceleration waveform within an in-road-surface region (the pre-step-in region $R_f$, a treading region $R_s$, and the post-kick-out region $R_k$), which is a region containing the information on the road surface, is set to be measurement data $x_1(t)$, this measurement data $x_1(t)$ is decomposed into a plurality of intrinsic vibration modes (Intrinsic Mode Function: IMF) using an algorithm of empirical mode decomposition (EMD), and after decomposition, Hilbert transform is performed on each IMF to calculate a feature amount.

The intrinsic vibration mode extracting means 13 obtains, from the measurement data $x_1(t)$, a plurality of IMFs ($C_1$, $C_2$, ..., $C_n$) using the algorithm of the EMD, and extracts an arbitrary IMF $C_k$ from the obtained plurality of IMFs.

Hereunder, an explanation will be given of how to obtain the IMF.

Figure 4:
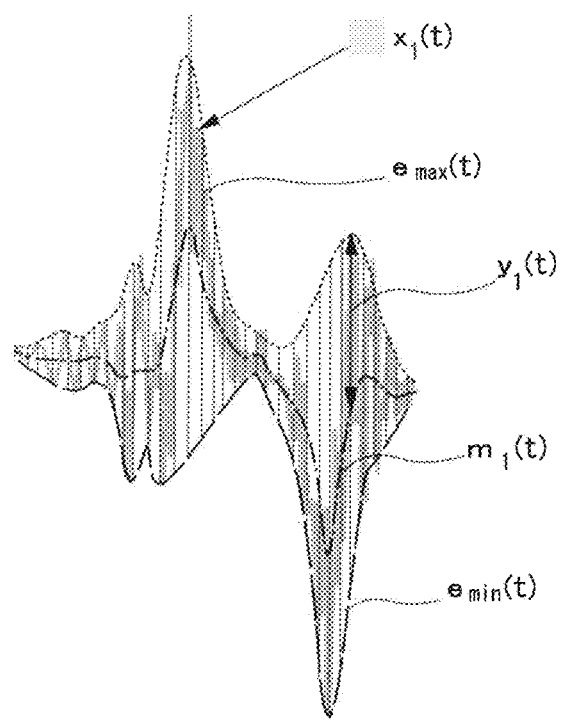
FIG. 4 is a diagram illustrating a method of acquiring an intrinsic oscillation mode.

First, as illustrated in FIG. 4, all of maximum points and minimum points of the measurement data $x_1(t)$ are extracted, after obtaining an upper envelope $e_{max}(t)$ connecting the maximum points and a lower envelope $e_{min}(t)$ connecting the minimum points, a local mean $m_1(t)=(e_{max}(t)+e_{min}(t))/2$ of the upper envelope $e_{max}(t)$ and the lower envelope $e_{min}(t)$ is calculated.

Next, a different waveform $y_1(t)=x_1(t)-m_1(t)$ between the measurement data $x_1(t)$ and the local mean $m_1(t)$ is obtained. The different waveform $y_1(t)$ is poor in the symmetric property and thus cannot be said to be an IMF. Accordingly, the different waveform $y_1(t)$ is subjected to the processing similar to the processing performed on the measurement data $x_1(t)$ to obtain a different waveform $y_2(t)$. Further, by repeating this processing, different waveforms $y_3(t)$, $y_4(t)$, ..., $y_n(t)$ are obtained. As to a different waveforms $y_k(t)$, The greater k becomes, the higher the symmetrical property becomes and the closer the IMF becomes.

As a condition under which the difference waveform becomes IMF, there has been proposed a condition under which the number of zero cross points and the number of peaks of the $y_k(t)$ do not change for four to eight times successively in the process of obtaining the IMF, and the number of zero cross points coincides with the number of peaks of the $y_k(t)$. Incidentally, a difference waveform $y_{k-1}(t)$ at the time point when a standard deviation of the local mean $m_k(t)$ becomes equal to or lower than a threshold value.

The IMF extracted from the measurement data $x_1(t)$ is referred to a first IMF $C_1$.

Next, a second IMF $C_2$ is extracted from the first IMF $C_1$ and the measurement data $x_1(t)$. More specifically, data $x_2(t)=x_1(t)$—the first IMF $C_1$ is defined as new measurement data, and the second IMF $C_2$ is extracted by subjecting the new measurement data $x_2(t)$ to the processing similar to the processing performed on the measurement data $x_1(t)$.

This processing is repeated and, the processing for obtaining the IMF is finished at a time pint when an n-th IMF $C_n$ becomes a waveform whose extreme value is not more than 1. The number of the extracted IMFs varies depending on an original waveform (measurement data), however, normally, ten to fifteen of IMFs are extracted.

Incidentally, an IMF $C_n$ is extracted in order from a high frequency component.

In addition, a sum of all of the IMF $C_k$ equals the measurement data $x_1(t)$.

For determining the road surface, since it is necessary to focus on the high-frequency component of the tire vibration, as an IMF $C_1$ of a lower number in order such as the first IMF or the second IMF $C_2$ may be used.

Note that in order to reduce the amount of calculation, it is sufficient to extract only IMF to be used and stop the calculation. For example, in a case of using only the third IMF $C_3$, the calculation for extracting an IMF $C_4$ and the following IMFs may be omitted.

Hereinafter, the k-th IMF $C_k$, which is the IMF to be used, is defined as $X_1(t)$.

The feature data calculating means 14 performs Hilbert transform on the obtained IMF X resulting k performs Hilbert transform on the $X_k(t)$ to calculate an instantaneous frequency $f_k(t)$ and an instantaneous amplitude $a_k(t)$. The instantaneous frequency $f_k(t)$ is time differential of a phase function $\theta_k(t)$.

Hilbert transform of $X_k(t)$ is obtained by the following equation.

[Math. 1]

$$Y_k(t) = \frac{1}{\pi} \int_{-\infty}^{\infty} X_k(\tau) \frac{1}{t-\tau} d\tau \quad (1)$$

By this Hilbert transform, an analysis waveform $Z_k(t)$ for calculation of the feature data is expressed by the following equations (2) to (4). Further, the instantaneous frequency $f_k(t)$ can be obtained by the following equation (5).

[Math. 2]

$$Z_k(t) = X_k(t) + jY_k(t) = a_k(t)e^{i\theta_k(t)} \quad (2)$$

$$a_k(t) = \sqrt{X_k(t)^2 + Y_k(t)^2} \quad (3)$$

$$\theta_k(t) = \tan^{-1}\left(\frac{Y_k(t)}{X_k(t)}\right) \quad (4)$$

$$f_k(t) = \frac{1}{2\pi} \frac{d\theta}{dt} \quad (5)$$

Figure 5:
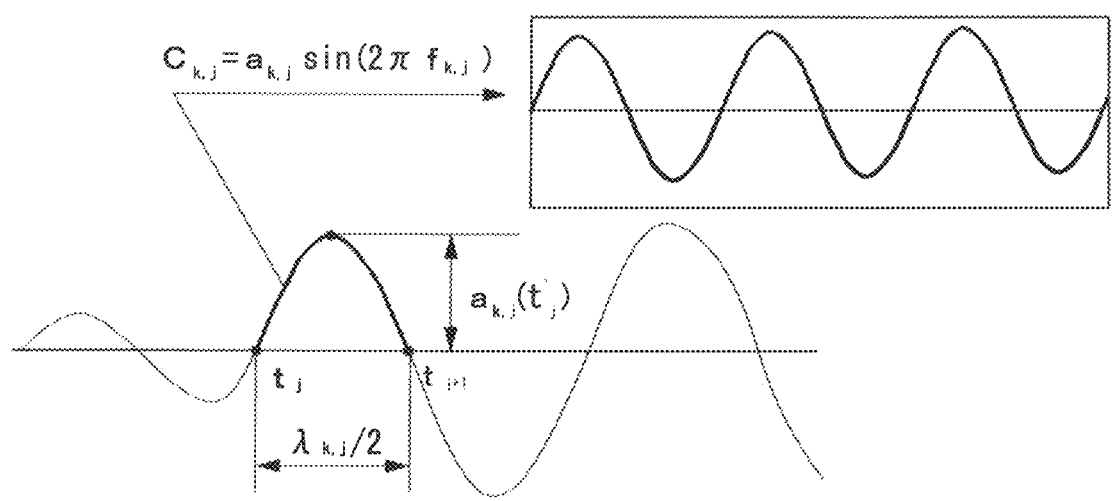
FIG. 5 is a diagram illustrating a method of acquiring feature data.

As illustrated in FIG. 5, the waveform of each IMF $X_k(t)$ has a zero cross points at a plurality of times $t_j$ and a maximum value of the instantaneous amplitude between the time $t_j$ and a time $t_{j+1}$.

Therefore, the waveform between the time $t_j$ and the time $t_{j+1}$ illustrated by a bold line is reared as a part ($\lambda_{k,j}/2$) of a waveform $C_{k,j}$ whose instantaneous frequency is $f_k(t_j)$ instantaneous amplitude is $a_k(t'_j)$, and the instantaneous frequency $f_k(t_j)$ and the instantaneous amplitude $a_k(t'_j)$ are regarded as the feature data of each IMF $X_k(t)$. Here, $t'_j = (t_j + t_{j+1})/2$.

The feature amount calculating means 15 calculates an average $\mu_k$, a standard deviation $\sigma_k$, and a skewness $b_{1k}$.

These statistic amounts are statistic amounts that are independent of time, hence employed as feature amounts. The feature amount is determined for each $C_k$.

Hereinafter, the feature amount to be used is regarded as a feature amount of the first IMF $C_1$.

Figure 6:
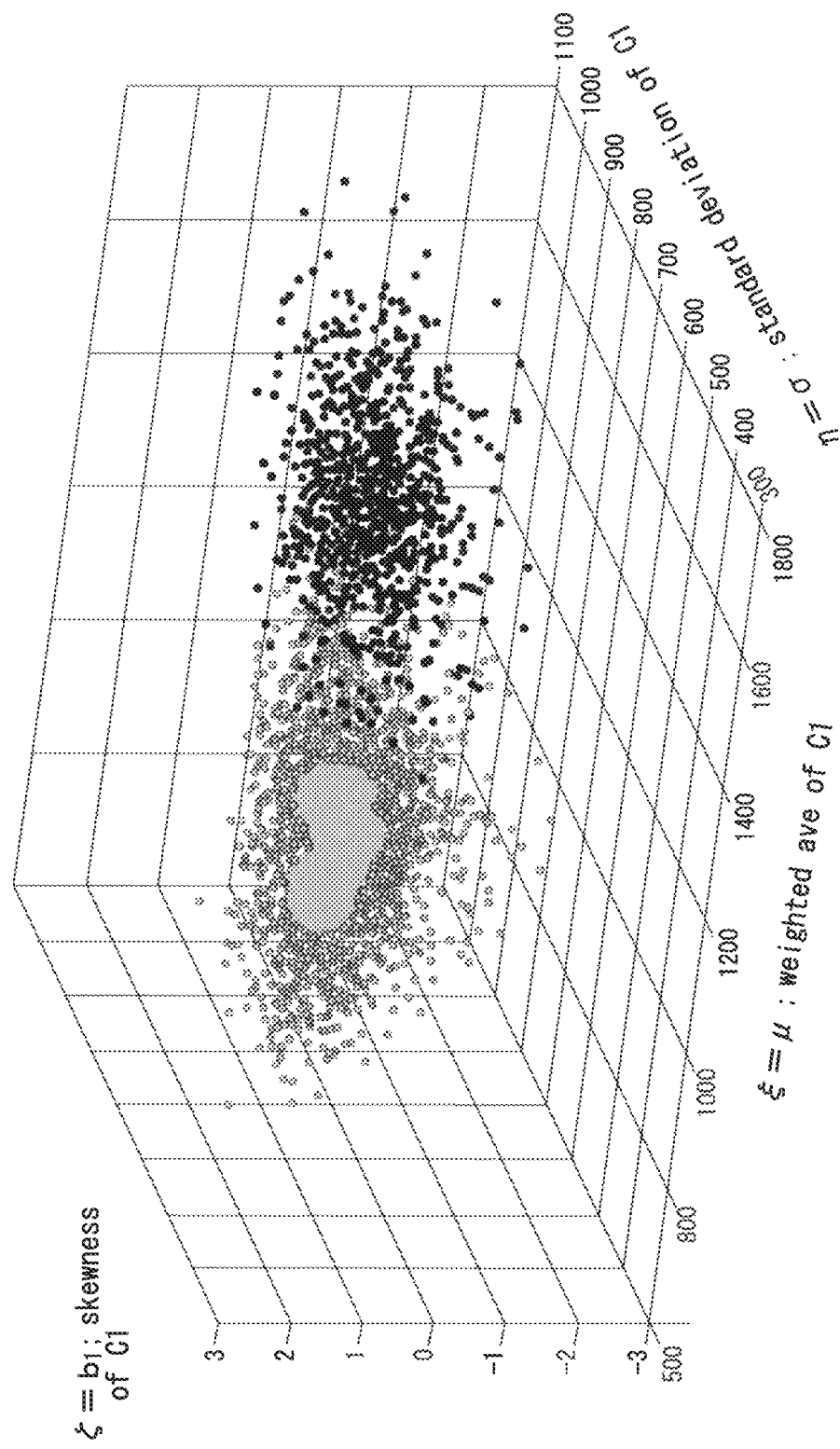
FIG. 6 is a diagram illustrating an example of distribution states of feature amount.

FIG. 6 is a diagram illustrating distribution of feature amounts calculated from acceleration waveforms when running on two road surfaces in conditions of DRY and WET, in which $\xi$ is an average $\mu$, $\eta$ axis is the standard deviation $\sigma$, and $\xi$ axis is the skewness $b_1$. In addition, the circles with a thin color are data of the DRY road surface, and the circles with a thick color are data of the WET road surface.

Here, assuming that the feature amount $X=(\mu, \sigma, b_1)$, FIG. 6 is an input space of the feature amount X and, if a group of vehicles running on the DRY road surface indicated by the thin circles is distinguishable from a group of vehicles running on the WET road surface, it is possible to determine whether the road surface on which the vehicle is running is the DRY road surface or the WET road surface.

Similarly, also from the acceleration waveform obtained when running on the SNOW road surface or the ICE road surface, it is possible to determine the distribution of feature amounts on the SNOW road surface or the distribution of feature amounts on the ICE road surface.

The storage means 16 stores four road surface models for separating, by the discriminant function f(x) indicative of a separation hyperplane, a DRY road surface from other road surfaces, a WET road surface from other road surfaces, a SNOW road surface from other road surfaces, and an ICE road surface from other road surfaces, that have been obtained in advance.

The road surface model is configured by a support vector machine (SVM), after obtaining a feature amount $Y_A=(\mu_A, \sigma_A, b_{1A})$ calculated from time-series waveforms of the tire vibration, which are obtained by running a test vehicle equipped with a tire having an acceleration sensor mounted therein, at various speeds on each of the DRY road surface, WET road surface, SNOW road surface, and ICE road surface, taking $Y_A$ as learning data. Incidentally, the suffix A indicates DRY, WET, SNOW, and ICE. Further, the feature amount in the vicinity of a discrimination boundary selected by the SVM is called a road surface feature amount $Y_{ASV}$.

Figure 7:
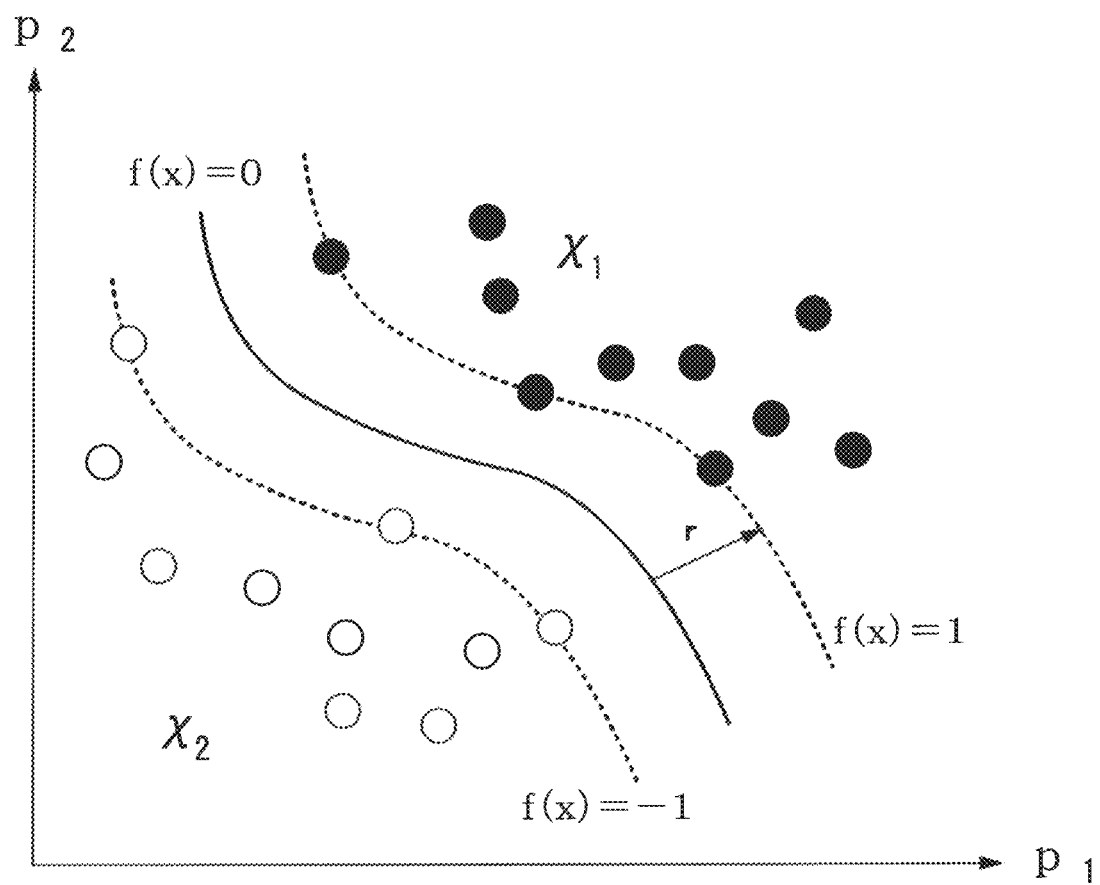
FIG. 7 is a schematic diagram illustrating a separation hyperplane in an input space and a feature space.

FIG. 7 is a conceptual diagram illustrating DRY road surface feature amount $Y_{DSV}$, and road feature amount $Y_{nDSV}$ of road surfaces other than the DRY road surface. In FIG. 7, the DRY road surface is indicated by black dots, and the road surfaces other than the DRY road surface are indicated by white dots. Incidentally, the number of feature amounts in an actual input space is three, however, FIG. 7 is illustrated in two dimensions (transverse axis: $p_1$, vertical axis: $p_2$). The storage means 16 does not necessarily store all of $Y_D$, $Y_w$, $Y_S$, and $Y_I$, and may store only $Y_{DSV}$, $Y_{WSV}$, $Y_{SSV}$, and $Y_{ISV}$.

Linear separation of the discrimination boundaries of the groups is generally impossible. Therefore, with the use of the kernel method, road surface feature vectors $Y_{DSV}$ and $Y_{nDSV}$ are mapped in a high-dimensional feature space by non-linear mapping $\varphi$ so as to perform non-linear classification for the road surface feature vectors $Y_{DSV}$ and $Y_{nDSV}$ in the original input space.

Specifically, by using aggregation of data $X=(x_1, x_2, \ldots x_n)$ and belonging class $z=\{1, -1\}$, an optimum discriminant function $f(x) = w^T \varphi(x) - b$ is obtained.

Here, the data are data of the DRY road surface having the road surface feature amount $Y_D$ and $Y_{nD}$, and whose belonging class $z=1$ is indicated by $x_1$ in FIG. 7, and data of the road surfaces other than the DRY road surface whose belonging class $z=-1$ is indicated by $X_2$ in FIG. 7. Further, w is a weighting factor, b is a constant and $f(x)=0$ is the discrimination boundary.

The discriminant function $f(x)=w^T \varphi(x)-b$ is optimized, by using the Lagrange multiplier method, for example. The optimization problem is replaced by the following equations (6) and (7).

[Math. 3]

$$\text{maximize} \sum_\alpha \lambda_\alpha - \frac{1}{2}\sum_{\alpha,\beta}\lambda_\alpha \lambda_\beta z_\alpha z_\beta \varphi(x_\alpha)\varphi(x_\beta) \quad (6)$$

$$\text{subject to} \sum_\alpha \lambda_\alpha z_\alpha = 0, \lambda_\alpha > 0 \quad (7)$$

Here, $\alpha$ and $\beta$ are indexes of learning data. Also, $\lambda$ is the Lagrange multiplier, where $\lambda>0$.

At this time, by replacing an inner product $\varphi(x_\alpha) \varphi(x_\beta)$ with the kernel function $K(x_\alpha, x_\beta)$, the discriminant function $f(x)=w^T \varphi(x)-b$ can be non-linearized. The $\varphi(x_\alpha) \varphi(x_\beta)$ is the inner product obtained after mapping the $(x_\alpha)$ and $(x_\beta)$ by the map $\varphi$ into a high-dimensional space.

The Lagrange multiplier $\lambda$ can be obtained using an optimization algorithm such as the steepest descent method, the sequential minimal optimization (SMO) and the like. At this time, because the kernel function is used, it is unnecessary to directly obtain a high-dimensional inner product. Accordingly, the time problem can be reduced remarkably.

In this example, as the kernel function $K(x_\alpha, x_\beta)$, the Gaussian kernel (RBF kernel) shown in the following equation is used.

[Math. 4]

$$K(x_\alpha, x_\beta) = \exp\left(-\frac{\|x_\alpha - x_\beta\|}{2\sigma^2}\right) \quad (8)$$

In order to distinguish between the DRY road surface and road surfaces other the than the DRY road surface, it is possible to accurately distinguish between the DRY road surface and the road surfaces other than the DRY road surface by giving a margin to the discrimination function $f(x)$ which is the separation hyperplane that separates the DRY road surface feature vector $Y_D$ from the road surface feature vector $Y_{nD}$ of the road surfaces other the than the DRY road surface. The margin refers to a distance from the separation hyperplane to the nearest sample (support vector), and the separation hyperplane that is the discrimination boundary is $f(x)=0$.

Then, as illustrated in FIG. 7, the DRY road surface feature vector $Y_D$ exists in the region of $f(x) \geq +1$, and the road surface feature vector $Y_w$ of the road surfaces other the than the DRY road surface is located in the region of $f(x) \leq -1$.

The DRY road surface model that distinguishes between the DRY road surface and the road surfaces other than the DRY road surface is an input space including the support vector $Y_{DSV}$ located at the distance of $f(x)=+1$, and the support vector $Y_{nDSV}$ located at the distance of $f(x)=-1$. $Y_{DSV}$ and $Y_{nDSV}$ generally exist in a plurality of numbers.

The kernel function calculating means 17 calculates, from the feature amount X calculated by the feature amount calculating means 15 and the respective support vectors $Y_{DSV}$, $Y_{WSV}$, $Y_{SSV}$ and $Y_{ISV}$ of the DRY model, WET model, SNOW model and ICE model that are stored in the storage means 16.

The road surface condition determining means 18 determines a road surface condition on the basis of the values of four discriminant functions $f_D(x)$, $f_W(x)$, $f_S(x)$, and $f_I(x)$ using the kernel functions $K_D(x, y)$, $K_w(x, y)$, $K_S(x, y)$ and $K_I(x, y)$, shown in the following equations (9) to (12).

[Math. 5]

$$f_D = \sum_{\alpha=1}^{N_{DSV}} \lambda_{D_\alpha} z_{D_\alpha} K_D(X, Y_\alpha) - b_D \quad (9)$$

$$f_W = \sum_{\alpha=1}^{N_{WSV}} \lambda_{W_\alpha} z_{W_\alpha} K_W(X, Y_\alpha) - b_W \quad (10)$$

$$f_S = \sum_{\alpha=1}^{N_{SSV}} \lambda_{S_\alpha} z_{S_\alpha} K_S(X, Y_\alpha) - b_S \quad (11)$$

$$f_I = \sum_{\alpha=1}^{N_{ISV}} \lambda_{I_\alpha} z_{I_\alpha} K_I(X, Y_\alpha) - b_I \quad (12)$$

where $f_D$ is the discriminant function that discriminates the DRY road surface from the other road surfaces, $f_W$ is the discriminant function that discriminates the WET road surface from the other road surfaces, $f_S$ is the discriminant function that discriminates the SNW road surface from the other road surfaces, and $f_I$ is the discriminant function that discriminates the ICE road surface from the other road surfaces.

Further, $N_{DSV}$ is the number of support vectors of the DRY model, $N_{WSV}$ is the number of support vectors of the WET model, $N_{SSV}$ is the number of support vectors of the SNOW model, and $N_{ISV}$ is the number of support vectors of the ICE model.

Values such as the Lagrange multiplier $\lambda$ of the discriminant function are obtained by the learning performed in obtaining the discriminant function for discriminating the DRY surface and the other surfaces.

In this example, the respective discriminant functions $f_D$, $f_W$, $f_S$ and $f_I$ are calculated, and a road surface condition is determined from a discriminant function that indicates the largest value of the calculated discriminant function $f_A$.

Figure 8:
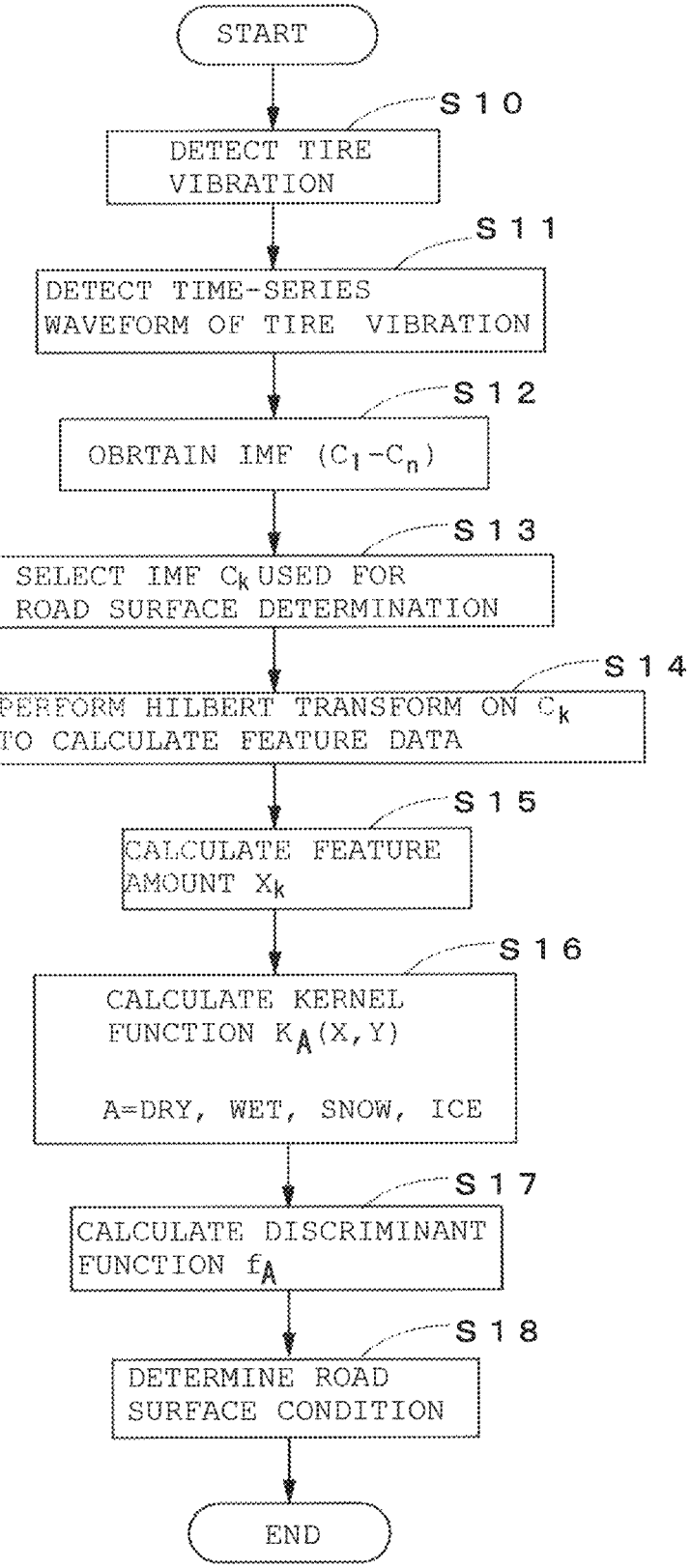
FIG. 8 is a flowchart illustrating a method of determining a road surface condition according to the exemplary embodiment of the present invention.

Next, with respect to the method of discriminating a condition of a road surface on which the tire 20 is running, an explanation is given using the road surface condition determination apparatus 10, by referring to the flowchart of FIG. 8.

First, a tire vibration generated by an input from the road surface R on which the tire 20 is running by the acceleration sensor 11 is detected (step S10), and a time-series waveform of tire vibration is extracted from a signal of the detected tire vibration (step S11).

Then, from the data of the extracted time-series waveform of tire vibration, a plurality of IMFs $C_1$ to $C_n$ are obtained (step S12) using the algorithm of EMD. After that, from these IMFs, lower numbers of first to third IMFs $C_1$ to $C_n$ are extracted and IMF $C_k$, used for determination of the road surface condition is selected, and this IMF $C_k$ is set to $X_k(t)$ (step S13).

Next, Hilbert transform is performed on $X_k(t)$ to calculate an instantaneous frequency $f_k(t)$ and the maximum value of an instantaneous amplitude $a_k(t)$ at the zero point that is the feature data (step S14), then statistic amount is calculated from the distribution of the instantaneous amplitude $a_k(t)$ to the instantaneous frequency $f_k(t)$ and the calculated statistic amount is set to the feature amount $X_k$ (step S15). In this example, the statistic amount is set to an average $\mu_k$, a standard deviation $\sigma k$, and a skewness $b_{1k}$.

Next, the kernel function $K_A(X, Y)$ is obtained from the calculated feature amount $X_A$ and the support vector $Y_A$ of the road surface model stored in the storage means 16 (step S16). Here, the suffix A indicates DRY, WET, SNOW and ICE.

Then, the four discriminant functions $f_D(x)$, $f_W(x)$, $f_S(x)$, and $f_I(x)$ using the kernel functions $K_A(x, y)$ are calculated (step S17), and thereafter, values of the calculated discriminant functions $f_A(x)$ are compared to determine a road surface condition of the discriminant function showing the largest value to be the road surface condition on which the tire 20 is running (step S18).

Figure 9:
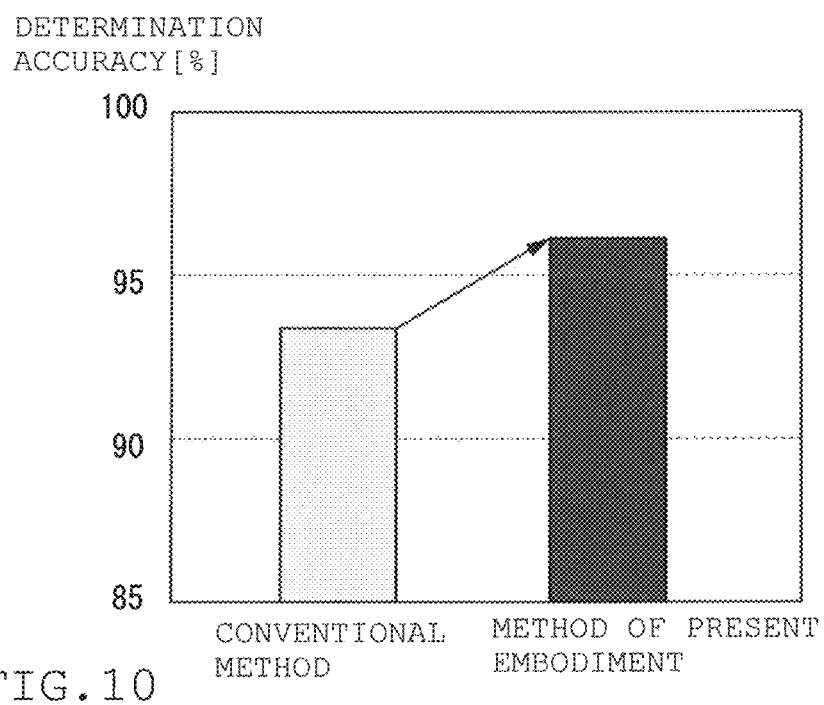
FIG. 9 is a diagram illustrating comparison of road surface determination accuracies between a conventional method and the method according to the exemplary embodiment of the present invention.

FIG. 9 is a diagram illustrating comparison of road surface determination accuracies between the method according to the exemplary embodiment of the present invention and a conventional method. In the conventional method, a road surface is determined by using, as a feature amount, a vibration level of a specific frequency calculated from a time-series waveform of a tire vibration and using a GA kernel. Apparent from FIG. 9, in the method according to the exemplary embodiment, approximately 3% to 4% of the determination accuracy is increased compared to the conventional method.

Figure 10:
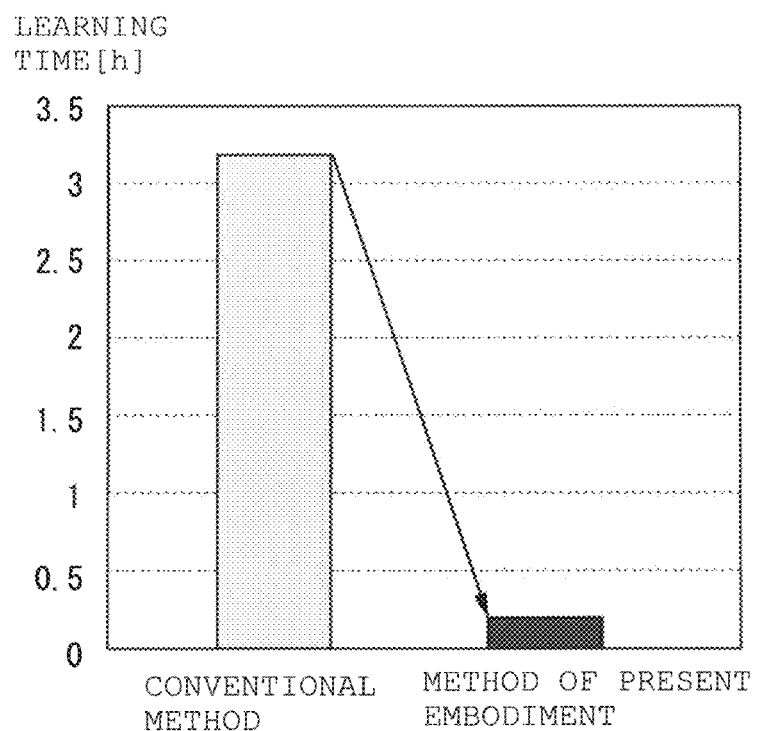
FIG. 10 is a diagram illustrating comparison of learning time between a conventional method and the method according to the exemplary embodiment of the present invention.

Further, as illustrated in FIG. 10, as a result of comparison between the method according to the exemplary embodiment and the conventional method, a significant improvement has been attained, when comparing, using data after extracting the feature, the time taken for the support vector machine learning for the same number of data (approximately 3300 data). Therefore, it has been confirmed that, in the method according to the exemplary embodiment, the amount of calculations has been remarkably reduced compared to the conventional method.

The present invention has been explained using the exemplary embodiment, however, the technical scope of the present invention is not limited to the scope described in the above exemplary embodiment. It is apparent to those skilled in the art that various modifications and improvements may be added to the exemplary embodiment. It is also apparent from the scope of the claims that embodiments with such modifications and improvements may also be included within the technical scope of the present invention.

For example, in the exemplary embodiment described above, the acceleration sensor 11 is used as tire vibration detecting means, however, other vibration detecting means such as a pressure sensor may be used. In addition, with respect to an installation location of the acceleration sensor 11, one sensor may be disposed at a position separated for a certain distance in the tire width direction from the tire width direction center, or may be disposed at other location such as in a block, for example. Further, the number of the acceleration sensor 11 is not limited to one, but may be provided at a plurality of locations in the tire circumferential direction.

Further, in the embodiment described above, the first IMF $C_1$ has been used as IMF for calculating the feature amount, however, other IMFs may be used. Incidentally, as described above, for the road surface determination, it is desirable to use an IMF of the lower number as an IMF for calculating the feature amount since it is necessary to focus on a high-frequency component of the tire vibration.

Note that, in order to reduce the amount of calculations, it is sufficient to extract only IMF to be used and stop the calculation. For example, in the case of using only the third IMF $C_3$, calculations for extracting the fourth IMF $C_4$ and the subsequent IMFs may be omitted. Further, in the embodiments, the first IMFC as IMF 1 was used alone, a plurality of IMF, by determining the road surface for each IMF, it is possible to improve the accuracy of the road surface determined.

Further, in the exemplary embodiment described above, the first IMF $C_1$ has been used as an IMF, however, the accuracy of road surface determination may be improved by using a plurality of IMFs and perform the road surface determination.

Furthermore, in the exemplary embodiment described above, as the feature amounts, the mean $\mu$, the standard deviation $\sigma$ and the skewness $b_1$ have been taken, however, other statistic amount such as a kurtosis $b_2$ may be further added. Alternatively, a plurality of statistic amounts may be combined from among the mean $\mu$, the standard deviation $\sigma$, the skewness $b_1$, the kurtosis $b_2$ and so on.

Further, in the exemplary embodiment described above, although the statistic amount obtained from the distribution of the instantaneous frequency $f(t)$ has been used as the feature amount, the statistic amount obtained from the distribution of the instantaneous amplitude $a(t)$ may be used.

Further, in the exemplary embodiment described above, the determination is made to determine that which one of the DRY road surface, WET road surface, SNOW road surface and ICE road surface the tire 20 is running on. However, in a case where the determination is made on two road surfaces such as DRY/WET, instead of using two boundary lines, drawn by the support vector machine, of a boundary plane (DRY boundary plane) of the distribution of the feature amounts of one of the road surface conditions and a boundary plane (WET boundary plane) of the distribution of the feature amounts of the other one of the road surface conditions, if the road surface condition determination is performed by using one boundary plane ((DRY-WET boundary plane) that separates one of the road surface conditions from the other one of the road surface conditions, the accuracy of the road surface condition determination may be further improved.

Figure 11A:
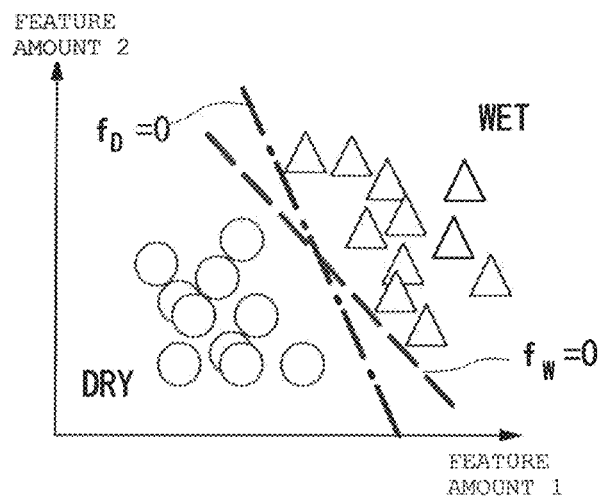
FIGS. 11A and 11B are diagrams each illustrating a boundary plane for determination of two road surfaces DRY and WET.

Conventionally, a boundary plane (hyperplane) of the distribution of support vectors (feature amounts) of DRY road surface is almost the same with a plane whose discriminant function becomes $f_D=0$ that separates the DRY road surface from the other road surfaces (WET road surface, SNOW road surface and ICE road surface), and a boundary plane of the distribution of support vectors (feature amounts) of WET road surface is almost the same with a plane whose discriminant function becomes $f_W=0$ that separates the WET road surface from the other road surfaces. For this reason, the road surface determination for two road surfaces of DRY/WET has been performed by using two boundary lines of a boundary plane $f_D=0$ for determining the DRY road surface, which is indicated by a dotted line in FIG. 11A and a boundary plane $f_W=0$ for determining the WET road surface, which is indicated by a broken line in FIG. 11A.

Figure 11B:
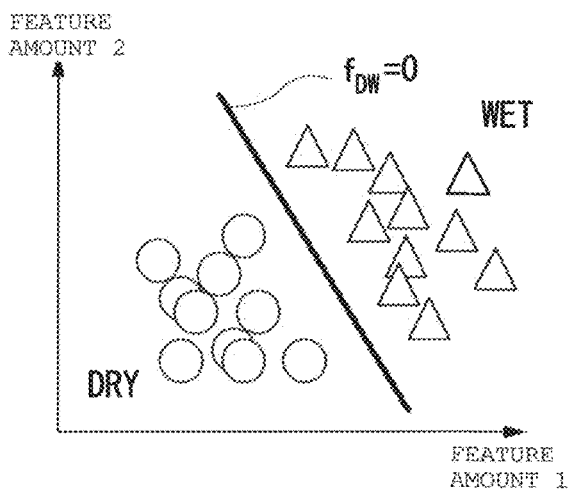

Therefore, as illustrated in FIG. 11B, by determining the boundary plane to be a boundary plane $f_{DW}=0$ of the support vector of the DRY road surface and the support vector of the WET road surface, the boundary planes are made to be a single boundary plane. As a result, the accuracy of the two road surface conditions of DRY/WET has been further improved.

Incidentally, it goes without saying that, for the determination of other two road surfaces such as DRY/SNOW, DRY/ICE or WET/SNOW, when the boundary planes are made single, the accuracy of the two road surface conditions is further improved.

Example

The support vector of the DRY road surface and the support vector of the WET road surface were determined by the machine learning (SVM) using, as learning data, road surface data that have been obtained in advance and that are feature amounts of respective time windows calculated from time-series waveforms of tire vibrations when running on the DRY road surface and the WET road surface.

Specifically, as shown in Table 1 below, the used road surface data were divided into data for training (Train) and data for testing (Test), to determine support vectors of the DRY road surface and support vectors of the WET road surface. Thereafter, a boundary plane between the DRY road surface and the WET road surface was obtained. At this time, hyper parameters C and σ of the support vector machine were employed such that values of the hyper parameters C and σ become maximum in terms of the accuracy under respective conditions. At this time, the numbers of the support vectors were five.

TABLE 1

| Data | Train | Test |
|---|---|---|
| DRY | 2130 | 1071 |
| WET | 694 | 346 |

Figure 12:
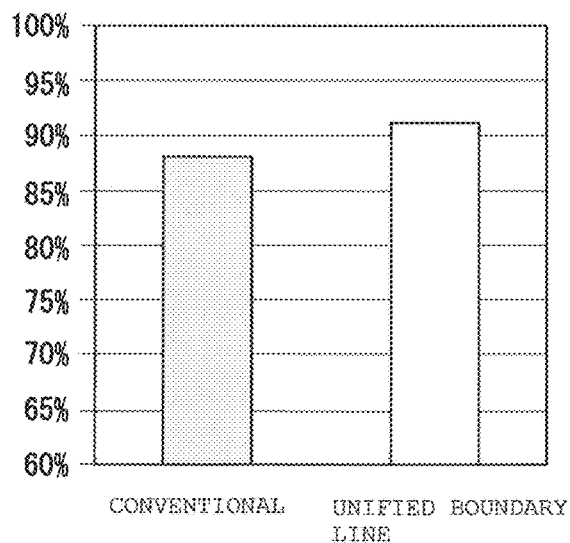
FIG. 12 is a diagram illustrating comparison of accuracies of determination of two road surfaces DRY and WET according to the conventional method and the method according to the exemplary embodiment of the present invention.

FIG. 12 is a graph illustrating comparison of the accuracy of determination of the DRY/WET road surfaces when the boundary plane is made single, and the accuracy of determination of the DRY/WET road surfaces when two boundary planes were used in the conventional method.

As illustrated in FIG. 12, since the determination accuracy was improved about 3% in the case where the boundary plane was made single, it has been confirmed that, by making the boundary planes single, the accuracy of the determination for two road surfaces of the DRY/WET road surfaces is improved.

Although the present invention has been described using the exemplary embodiment, the present invention can also be described as follows. That is, the present invention provides a method of determining a condition of a road surface being in contact with a tire from a time-varying waveform of vibration of the running tire, the time-varying waveform of vibration having been detected by a vibration detecting means. The method includes: a step of detecting the time-varying waveform of vibration of the tire; a step of acquiring a plurality of natural vibration modes, from data of the time-varying waveform, using an algorithm of empirical mode decomposition; a step of selecting and extracting an arbitrary natural vibration mode from the plurality of natural vibration modes; a step of calculating feature data by performing Hilbert transform on the extracted intrinsic vibration mode; a step of calculating a feature amount from a distribution of the feature data; and a step of determining the road surface condition from the calculated feature amount and a feature amount obtained in advance for each road surface condition, in which the feature amount is a statistic amount such as a mean, a standard deviation, a skewness and a kurtosis of the distribution of the feature data.

As described above, since the amount of calculations can be remarkably reduced by setting the feature amount extracted from the time-changing waveform of the tire vibration to the statistic amount that is not dependent on the time, it is possible to determine the road surface condition quickly and accurately.

Incidentally, the feature amount of each of the road surface conditions is obtained by the machine learning (SVM) using, as learning data, the feature amount of each time window calculated from the time-series waveform of the tire vibration obtained in advance for each of the road surface conditions.

Further, in the step of determining the road surface condition, a Gaussian kernel function is calculated from the calculated feature amount and the feature amounts having been obtained in advance for each of the road surface conditions, and thereafter the road surface condition is determined from a value of discriminant function using the calculated Gaussian kernel function. Therefore, the amount of calculations can surely be reduced.

Moreover, in a case where the road surface determination is performed for two road surfaces, in stead of two boundary planes of a boundary plane of distribution of feature amounts of one of the road surface conditions and a boundary plane of distribution of feature amounts of the other one of the road surface conditions, the road surface condition is determined using one boundary plane that is drawn by a support vector machine and that separates the one of road surface conditions from the other one of the road surface conditions. Therefore, the accuracy of the road surface condition determination is further improved.

Further, the present invention provides a road surface condition determination apparatus for determining a condition of a road surface being in contact with a tire. The apparatus includes: a vibration detecting means that is attached to the tire and that detects a time-varying waveform of vibration of the running tire; an intrinsic vibration mode extracting means that acquires a plurality of intrinsic vibration modes, from the time-varying waveform, using an algorithm of empirical mode decomposition, and extracting an arbitrary intrinsic vibration mode from the acquired plurality of intrinsic vibration modes; a feature data calculating means that calculates feature data by performing Hilbert transform on the extracted intrinsic vibration mode; a feature amount calculating means that calculates a feature amount from a distribution of the feature data; a storage means that stores the feature amount calculated using the time-varying waveform of the vibration having been obtained in advance for each road surface condition; a kernel function calculating means that calculates a Gaussian kernel function from the calculated feature amount and the feature amount having been obtained in advance for each road surface condition; and a road surface condition determining means that determines the road surface condition from a value of discriminant function using the calculated Gaussian kernel function, in which the feature amount is a statistic amount such as a mean, a standard deviation, a skewness and a kurtosis of distribution of the feature data, and in which the road surface condition determining means compares values of discriminant functions obtained for respective road surface conditions so as to determine the road surface condition.

With the use of the road surface condition determination apparatus having the above-mentioned configuration, the amount of calculations can be greatly reduced, and the road surface condition can be determined quickly and accurately.

Instead of the Gaussian kernel function, it is also possible to use a polynomial kernel function, an undefined value kernel function such as a Laplace kernel function.

REFERENCE SIGN LIST

10: Road surface condition determination apparatus, 11: Acceleration sensor, 12: Vibration waveform detecting means, 13: Intrinsic vibration mode extracting means, 14: Feature data calculating means, 15: Feature amount calculating means, 16: Storage unit, 17: Kernel function calculating means, 18: Road surface condition determining means, 20: Tire, 21: Inner liner portion, 22: Tire air chamber, and R: Road surface.

The invention claimed is:

1. A method of determining at least one road surface condition of a road surface being in contact with a running tire from a time-varying waveform of vibration of the running tire, the time-varying waveform of the vibration of the running tire having been detected by a vibration detecting means, the method comprising:
    a step of detecting the time-varying waveform of the vibration of the running tire;
    a step of acquiring a plurality of intrinsic vibration modes, from data of the time-varying waveform of the vibration of the running tire, using empirical mode decomposition;
    a step of selecting and extracting an arbitrary natural vibration mode from the plurality of intrinsic vibration modes;
    a step of calculating feature data by performing Hilbert transform on the extracted intrinsic vibration mode;
    a step of calculating a feature amount from a distribution of the feature data; and
    a step of determining the at least one road surface condition from the calculated feature amount and a feature amount obtained in advance for each of the at least one road surface condition,
    wherein the feature amount is a statistic amount of the distribution of the feature data.

2. The method according to claim 1, wherein the feature data are either one of or both of an instantaneous frequency and an instantaneous amplitude.

3. The method according to claim 1, wherein, the step of determining the at least one road surface condition includes calculating a Gaussian kernel function from the calculated feature amount and the feature amount obtained in advance for the each of the at least one road surface condition, and thereafter determining the at least one road surface condition from a value of a discriminant function using the calculated Gaussian kernel function.

4. The method according to claim 1, wherein, the step of determining the road surface condition includes calculating a polynomial kernel function or a Laplace kernel function from the calculated feature amount and the feature amount having been obtained in advance for the each of the at least one road surface condition, and thereafter determining the at least one road surface condition from a value of a discriminant function using the calculated kernel function.

5. The method according to claim 1, wherein, in a case where the road surface determination is performed for two road surfaces, instead of two boundary planes of a boundary plane of a distribution of feature amounts of one of the road surface conditions and a boundary plane of a distribution of feature amounts of the other one of the road surface conditions, the at least one road surface condition comprises two road surface conditions that are determined using one boundary plane that is drawn by a support vector machine and that separates the one of road surface conditions from the other one of the road surface conditions.

6. A road surface condition determination apparatus for determining at least one road surface condition of a road surface being in contact with a running tire, the apparatus comprising:
    a vibration detecting means that is attached to the tire and that detects a time-varying waveform of vibration of the running tire;
    an intrinsic vibration mode extracting means that acquires a plurality of intrinsic vibration modes, from the time-varying waveform of the vibration of the running tire, using empirical mode decomposition, and extracting an arbitrary intrinsic vibration mode from the acquired plurality of intrinsic vibration modes;
    a feature data calculating means that calculates feature data by performing Hilbert transform on the extracted intrinsic vibration mode;
    a feature amount calculating means that calculates a feature amount from a distribution of the feature data;
    a storage means that stores the feature amount calculated using the time-varying waveform of the vibration of the running tire having been obtained in advance for each of the at least one road surface condition;
    a kernel function calculating means that calculates a Gaussian kernel function from the calculated feature amount and the feature amount having been obtained in advance for the each of the at least one road surface condition; and
    a road surface condition determining means that determines the at least one road surface condition from a value of discriminant function using the calculated Gaussian kernel function,
    wherein the feature amount is a statistic amount of distribution of the feature data, and
    wherein the road surface condition determining means compares values of discriminant functions obtained for respective road surface conditions so as to determine the road surface condition.

* * * * *